United States Patent

[11] 3,621,153

[72] Inventor John W. Wenner
Boulder, Colo.
[21] Appl. No. 887,147
[22] Filed Dec. 22, 1969
[45] Patented Nov. 16, 1971
[73] Assignee International Business Machines Corporation
Armonk, N.Y.

[54] MAGNETIC READ/WRITE HEAD WITH PARTIAL GAP AND METHOD OF MAKING
10 Claims, 4 Drawing Figs.

[52] U.S. Cl. .......... 179/100.2 C, 29/603, 29/593, 340/174.1 F
[51] Int. Cl. .......... G11b 5/28, G11b 5/24, G11b 5/42
[50] Field of Search .......... 179/100.2 C; 340/174.1 F; 346/74 MC; 29/603, 593

[56] References Cited
UNITED STATES PATENTS 3,384,881 5/1968 Frost et al. .......... 346/74
3,000,078 9/1961 Emenaker .......... 179/100.2 C
3,224,074 12/1965 Peters .......... 29/603

*Primary Examiner*—Bernard Konick
*Assistant Examiner*—Jay P. Lucas
*Attorneys*—Hanifin and Jancin and F. A. Sirr

ABSTRACT: A magnetic head having a plurality of read/write tracks, each track being formed of a single continuous lamina of high-permeability magnetic material which is wrapped around the edge of a support substrate and extends through an opening in the substrate. A coil encircles one leg of each of the lamina, the coils being alternately placed on opposite sides of the substrate to allow minimum space between the tracks. A magnetic gap extends less than the complete distance across each individual lamina parallel to the edge of the substrate.

The electrical characteristics of each individual magnetic gap are monitored as the gap is cut. The cutting operation is terminated in accordance with the value of an electrical characteristic to obtain uniform gap characteristics for each of the gaps. The lateral position of the cut is adjusted in accordance with the value of an electrical characteristic to obtain longitudinal alignment of all of the gaps.

INVENTOR
JOHN W. WENNER

BY

ATTORNEY

MAGNETIC READ/WRITE HEAD WITH PARTIAL GAP AND METHOD OF MAKING

BACKGROUND AND SUMMARY OF THE INVENTION

Magnetic heads, as found in the prior art, are generally formed of a plurality of individual elements which must be carefully aligned during manufacture by relatively costly methods. In other prior art heads, a thin magnetic film is deposited on a nonmagnetic support material, utilizing a relatively complicated and expensive process, and a magnetic gap is then cut completely across the magnetic film. These deposited film heads have a short wear life when used in contact recording.

The present invention provides a simple and inexpensive magnetic head and method of making the same, by virtue of a structure utilizing individual bands of magnetic material which are wound with a coil and then individually wrapped around an edge of a support substrate. A magnetic gap is then cut only part way across the magnetic material generally parallel to the edge of the substrate. The unique concept of cutting the gap a distance less than completely across the magnetic material not only provides mechanical strength, but also allows the electrical characteristic of each individual gap to be controlled by controlling the length of the gap. The present invention also provides a method whereby the electrical characteristics of the gap being cut are compared to a standard and the cut is then controlled to produce heads having both uniform electrical characteristics and excellent physical alignment.

The foregoing and other objects, features, and advantages of the invention will be apparent from the following more particular description of a preferred embodiment of the invention, as illustrated in the accompanying drawings.

DESCRIPTION OF THE PREFERRED EMBODIMENT

Figure 1:
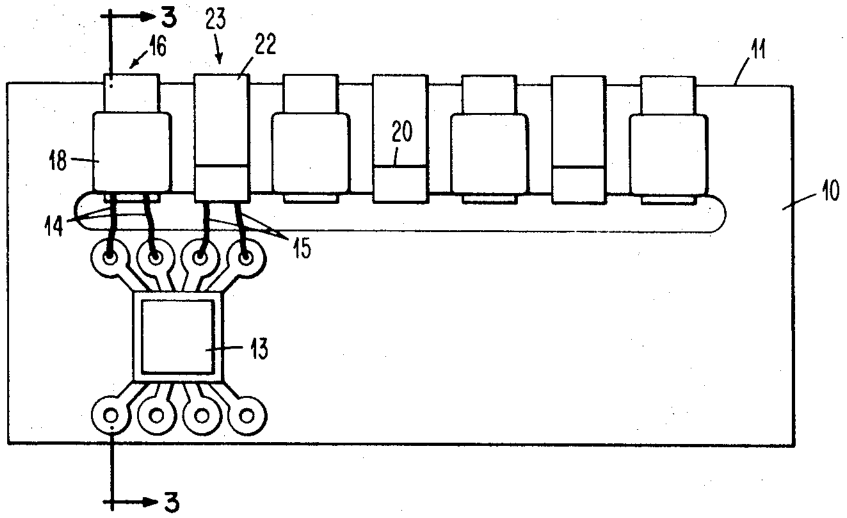
FIG. 1 is a side view of a multitrack head unit constructed in accordance with the teaching of the present invention.
Figure 2:
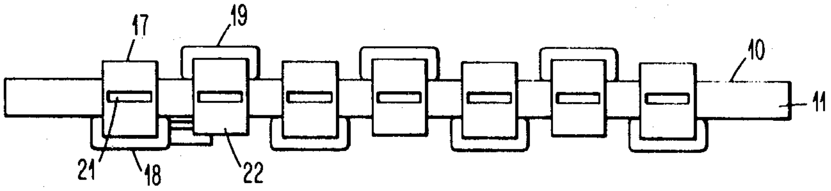
FIG. 2 is a top view.

FIG. 1 shows a side view of a multitrack head having seven read/write tracks. It is contemplated that a nine-track head could likewise be constructed utilizing the teachings of this invention. A nonmagnetic substrate 10 includes an upper edge 11 and an inwardly spaced elongated opening 12, opening 12 being arranged substantially parallel to edge 11. Substrate 10 provides physical support for the individual read/write tracks, as will be described, and also may be utilized to mount a number of electronic components; such as an integrated circuit chip 13, chip 13 being connected in very close proximity, to reduce electrical noise pickup to a minimum, to two of the tracks by means of electrical conductors 14 and 15. To illustrate construction, support member 10 may be a ceramic substrate.

Figure 3:
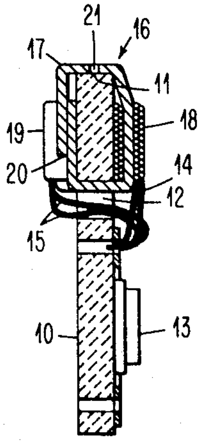
FIG. 3 is a section view taken along the line 3—3 of FIG. 1.

As can be best seen in FIG. 3, track 16, which is positioned adjacent the left-hand edge of substrate 10, is made of a single, continuous lamina of high-permeability magnetic material 17 (for example, Mumetal). During manufacture of the head, lamina 17 is an elongated, rectangular-shaped strip of metal. This strip of metal is first shaped in the form of an ell and then wound with a coil 18. The lamina is then U-shaped, placed around edge 11 of support substrate 10, and then wound around the edge of the substrate until the ends overlap at 20; the overlapping ends are then welded. This provides a physical, electrical and magnetic closed path for the lamina. The next step in the process of manufacture is the cutting of magnetic gap 21 adjacent edge 11 of substrate 10. As can be best seen in FIG. 3, magnetic gap 21 is of a length less than the width of lamina 17 and, more specifically, magnetic gap 21 is formed in lamina 17 such that a portion of the lamina bridges each longitudinal end of the gap 21.

Referring again to FIG. 3, reference numeral 19 identifies the coil which encircles a leg of lamina 22 which constitutes a portion of the second head track 23. Thus, a plurality of similar wire coils are provided, each encircling a leg of its respective lamina and being alternately placed on opposite sides of substrate 10.

Figure 4:
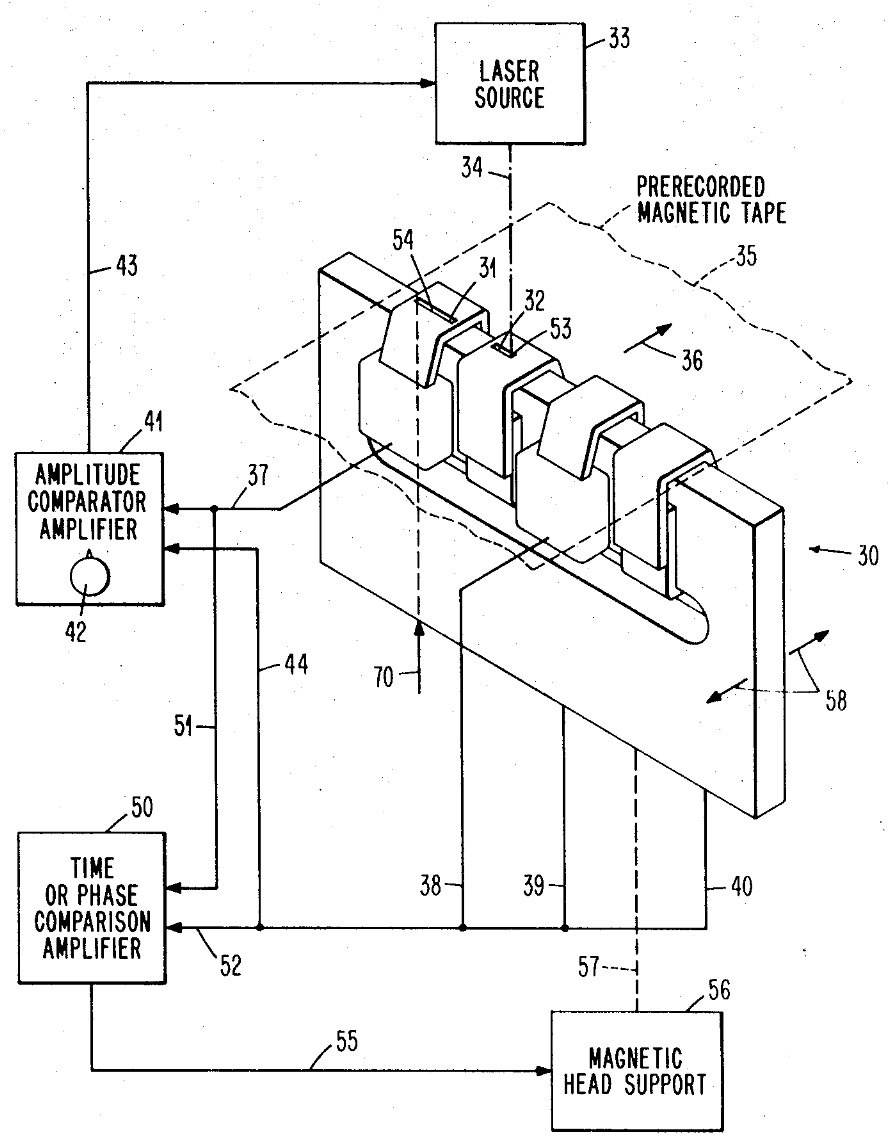
FIG. 4 is a view showing apparatus by which the method of the present invention may be practiced.

Referring now to FIG. 4, this figure discloses apparatus by which the method of the present invention may be practiced to produce a four-track head unit 30. In this figure, a magnetic gap 31 has been cut in the first track, and a magnetic gap 32 is in the process of being cut in the second track. The magnetic gaps are cut by means of laser source 33, whose laser beam is identified by broken line 34. A prerecorded magnetic tape 35 continuously moves over head 30 in the direction of arrow 36. While so moving, the prerecorded information on tape 35 is read out as an electrical characteristic by each of the magnetic tracks then having a magnetic gap. The coil of the track including gap 31 is connected to conductor 37, while the coils associated with the other three tracks are connected respectively to conductors 38, 39, and 40. While magnetic gap 31 was being cut, the output of that magnetic track was applied to the input of an amplitude comparator amplifier 41. When an electrical characteristic of this first track compares in a predetermined manner with that selected by control knob 42, the output of comparator amplifier 41, on conductor 43, is effective to terminate the cutting operation.

During subsequent cutting of each of the three remaining tracks, the output of the respective track then being cut is applied by way of conductor 44 to a second input of comparator amplifier 41, and the cutting procedure is again terminated when the cutting has produced a track having a predetermined electrical characteristic, as controlled by knob 42. By means of this method, head 30 will have four individual magnetic tracks with substantially identical electrical characteristics.

A further requirement of magnetic head 30 is that the individual magnetic gap in each of the four tracks shall be in accurate longitudinal alignment. Time comparison amplifier 50 is utilized to achieve this accurate alignment. The output of the first track, having magnetic gap 31, is connected to one input of time comparison amplifier 50 by way of conductor 51. During the cutting process of each subsequent magnetic gap, the output of the gap being cut is connected to a second input of time or phase comparison amplifier 50 by means of conductor 52. With the apparatus as shown in FIG. 4, laser beam 34 is presently cutting magnetic gap 32 at spot 53. This spot corresponds approximately to spot 54 of the previously cut magnetic gap 31. Both gaps 31 and 32 are reading the accurate prerecorded information placed on magnetic tape 35, and the time or phase relationship of the output of these two tracks is utilized by amplifier 50 to provide an output on conductor 55. This output controls magnetic head support structure 56, which is coupled to head unit 30 by means represented by broken line 57. Magnetic head support 56 is constructed to produce pivotal movement of structure 30 about axis 70, which is aligned with the left-hand edge of gap 31, either in the direction of movement of tape 35 or opposite to this direction, as indicated by arrow 58. As a result, gap 32 is cut in substantial longitudinal alignment with gap 31.

By way of example, and not by way of limitation, a nine-track embodiment of the present invention may be constructed with nine 0.040 inch tracks on 0.055 inch center such that substrate 10 has a thickness of 0.030 inch, a length of 1 inch, and a depth of 0.75 inch; opening 12 has a length of 0.5 inch, a width of 0.05 inch, and a 0.025 radius at each end; lamina 17 has a thickness of 0.002 to 0.003 inch, and a width of 0.040 inch; and gap 21 has a length of 0.038 inch and a width of 0.002 to 0.003 inch.

While the invention has been particularly shown and described with reference to a preferred embodiment thereof, it will be understood by those skilled in the art that various changes in form and details may be made therein without departing from the spirit and scope of the invention.

What is claimed is:

1. A magnetic head, comprising:

a nonmagnetic support substrate having opening means adjacent one edge thereof, a single continuous lamina of magnetic material extending through said opening means in said substrate and encircling said edge of said substrate, a read/write coil encircling a leg of said lamina on one side of said substrate between said opening and said edge of said substrate, and an elongated magnetic gap in said lamina substantially parallel to said edge of said substrate, said gap length being less than the width of said lamina.

2. A magnetic head as defined in claim 1 wherein said lamina is formed of a sheet of magnetic material whose ends are fastened as by welding to form a continuous loop which encircles and is supported by said substrate.

3. A magnetic head as defined in claim 1 wherein said magnetic gap is formed in said lamina such that a portion of said lamina bridges each longitudinal end of said gap.

4. A magnetic head as defined in claim 1 including:

a plurality of similar individual continuous lamina of magnetic material spaced from each other along said edge of said substrate and extending through said opening in said substrate, a plurality of similar coils, each encircling a leg of one of said lamina, and an elongated magnetic gap in each of said pluralities of lamina substantially parallel to said edge of said substrate and each extending a distance less than the width of the lamina.

5. A magnetic head as defined in claim 4 wherein said magnetic gap is centrally located in each of said lamina with a portion of said lamina bridging each longitudinal end of said gap.

6. A magnetic head as defined in claim 5 wherein the size of the magnetic gap in each of said lamina is controlled such that the resulting plurality of individual magnetic gaps have similar electrical characteristics.

7. A magnetic head as defined in claim 6, wherein said coils are alternately placed on opposite sides of said substrate.

8. The method of making a magnetic head comprising the steps of:

encircling a single lamina of magnetic material with a coil, wrapping the lamina around the edge of a support substrate so that the ends of said lamina engage, welding the ends of the lamina, cutting a magnetic gap in said lamina substantially parallel to said edge of said substrate and of a length less than the width of said lamina, monitoring an electrical characteristic of said gap during the cutting process, and terminating the cutting process in accordance with said electrical characteristic.

9. The method of making a magnetic head having a plurality of read/write gaps, comprising the steps of:

encircling each of a plurality of individual lamina of magnetic material with a coil, wrapping said laminae around the edge of a support substrate in spaced relationship so that the ends of each individual lamina overlap, welding the ends of each of said lamina, cutting a magnetic gap in each of said lamina substantially parallel to said edge of said substrate and of a length less than the width of said lamina, monitoring an electrical characteristic of each individual magnetic gap as it is cut, and terminating the cutting operation when said electrical characteristic reaches a given value.

10. The method of making a magnetic head as defined in claim 9, including the steps of:

monitoring an electrical signal received as a result of a magnetic gap in one of said lamina, comparing said electrical signal with the signal received as a result of a magnetic gap which is in the process of being cut, and controlling the position of the cut in accordance with said comparison in order to maintain the magnetic gaps in said laminae in alignment.

* * * * *